Oct. 26, 1965      F. M. TWIGG      3,214,070
BOW MAKING DEVICE
Filed Feb. 26, 1965
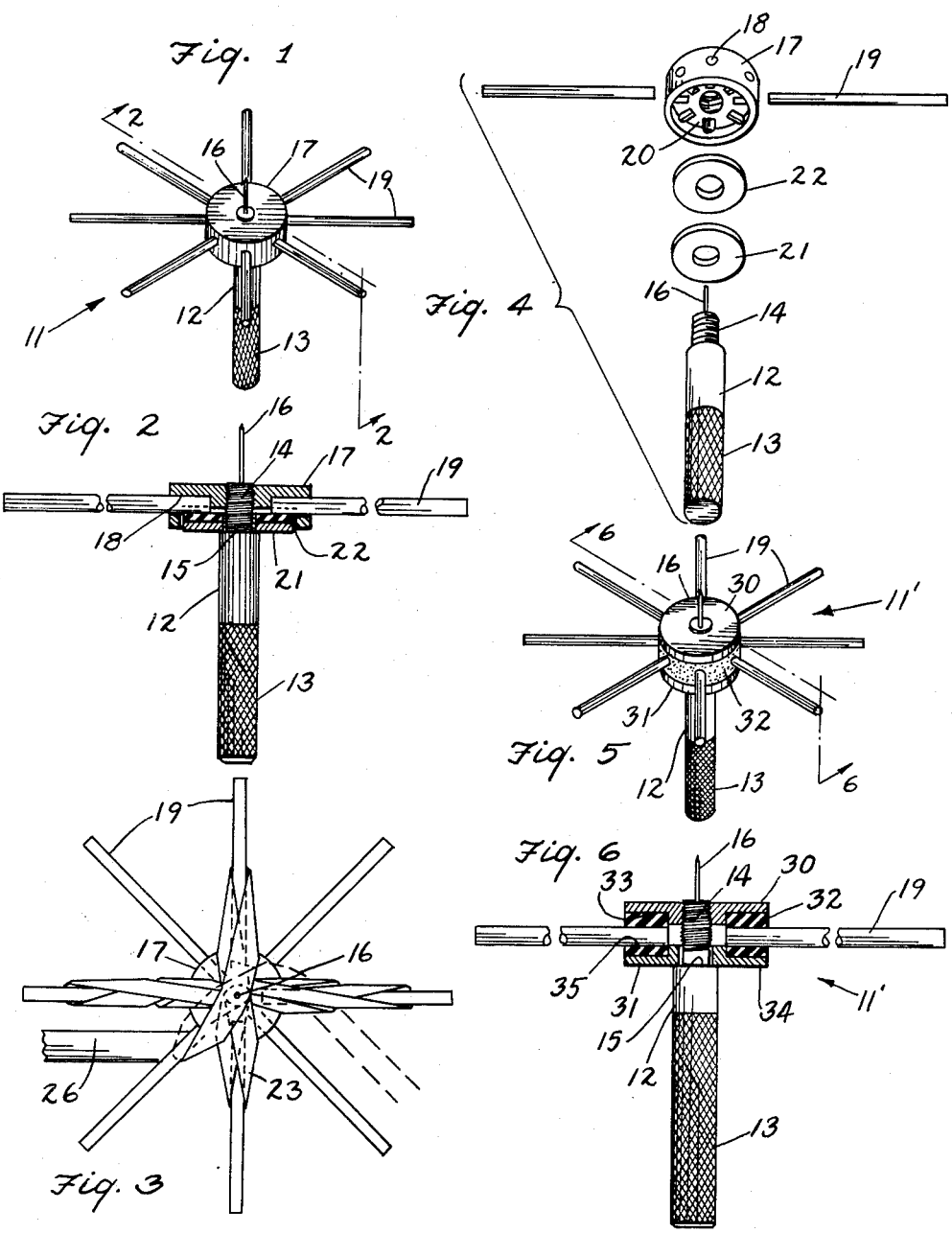
INVENTOR.
FRED M. TWIGG
BY
ATTORNEY United States Patent Office 3,214,070
Patented Oct. 26, 1965

3,214,070
BOW MAKING DEVICE
Fred M. Twigg, R.F.D. 1, Smithfield, Pa.
Filed Feb. 26, 1965, Ser. No. 435,601
8 Claims. (Cl. 223—46)

This invention relates to apparatus for making ornamental objects from a web of ribbon-like material, and more particularly to devices for forming decorative ribbon bows.

A main object of the invention is to provide a novel and improved apparatus for making ornamental rosettes or ribbon bows having multiple radial loops, the apparatus being of the type employing loop-supporting pegs which are detachable after a ribbon bow has been completed to permit the completed ribbon bow to be disengaged from the apparatus, said apparatus being simple in construction, being easy to use, and involving relatively inexpensive components.

A further object of the invention is to provide an improved apparatus for making ornamental multiple-loop ribbon bows or rosettes, said apparatus being capable of rapid assembly and disassembly, being compact in size, and greatly facilitating the manipulation of the ribbon-like web material employed thereon to form the multiple-loop ribbon bows, so that said bows may be formed rapidly, neatly, and by a very simple procedure.

Further objects and advantages of the invention will become apparent from the following description and claims, and from the accompanying drawings, wherein:

FIGURE 1 is a perspective view of one form of ribbon bow-making apparatus according to the present invention, shown assembled for use.

FIGURE 2 is an enlarged vertical cross-sectional view taken substantially on the line 2—2 of FIGURE 1.

FIGURE 3 is an enlarged top plan view of the apparatus of FIGURE 1, with portions of ribbon-like web material engaged thereon and illustrating the manner in which the apparatus is used in forming a multiple-loop ribbon bow.

FIGURE 4 is a perspective view showing parts of the apparatus of FIGURE 1 in separated positions.

FIGURE 5 is a perspective view similar to FIGURE 1, but showing another form of ribbon bow-making apparatus according to this invention.

FIGURE 6 is an enlarged vertical cross-sectional view taken substantially on the line 6—6 of FIGURE 5.

Referring to the drawings, 11 generally designates one form of apparatus according to the present invention. The apparatus 11 comprises a supporting shank 12, serving as a supporting handle or holder for the apparatus. Said shank is provided with a knurled or roughened lower surface portion 13 to facilitate gripping or holding same. The top end of the shank is reduced in diameter and is provided with male threads, as shown at 14, and thus defines an annular abutment shoulder 15 immediately below said threads. Secured to and projecting axially from the reduced threaded shank end 14 is a web-impaling pin 16 of substantial length.

Threadedly engaged on shank portion 14 is a generally cylindrical rigid hub member 17 formed with a plurality of equally spaced radially extending bores 18 which receive the inner ends of respective web-supporting rod members 19. The hub member 17 is formed with a concentric circular bottom recess 20 communicating with the radial bores 18. Designated at 21 is a rigid annular washer surrounding shank portion 14 and engaging shoulder 15, said washer being received in the lower portion of recess 20. An annular friction washer 22 of rubber or similar resilient deformable material is disposed in recess 20 between washer 21 and the inner ends of the rods 19, exerting frictional clamping force on said inner rod ends responsive to the tightening of shank 12 relative to hub member 17. Thus, the rods 19 are tightly locked to the hub member when the shank portion 12 is screwed tight relative to the hub, but may be released by unscrewing said shank portion.

In making a bow, one end of a ribbon 26 is impaled on the pin 16 and is threaded around a rod 19. The ribbon is then brought back to the pin and impaled thereon again, after which it is then threaded around the diametrically opposite rod 19, brought back and impaled on the pin, forming a figure 8-shaped base loop 23 for the bow, as shown in FIGURE 3. Another similar figure 8 is formed from the ribbon, in the same manner, over the first one. The ribbon is thereupon impaled over the pin and cut off close to said pin. Thereupon, another figure 8 is similarly formed at a 90° angle to said first two figure 8's and the ribbon is again impaled over the pin and cut off. There is therefore at this point a total of six loops, or three figure 8's on the device in the form of a cross. These three figure 8's will form the center of the bow and are necessary to give the finished product an attractive form. The next step is to impale the ribbon end on pin 16, thread the ribbon around another rod 19, bring it back and impale it on the pin, and then thread the ribbon around a rod 19 approximately 220° (at "seven o'clock") from the last-mentioned rod, as shown in full line view in FIGURE 3. This procedure is repeated, as shown in dotted view in FIGURE 3, until each rod has been threaded at least twice with the strip of ribbon, the ribbon being impaled on pin 16 every time it crosses same. The terminal end of the ribbon is also impaled on the pin before being cut off. This procedure is followed until another eight or sixteen loops have been formed, depending on the size of the bow desired. The shank 12 is then unscrewed and removed, the overlapping center portions of the ribbon being manually held when the pin 16 is disengaged therefrom, and are fastened together by stitching through the central aperture of the hub member, only a few stitches being necessary to secure said overlapping portions together. The rods 19 are then removed from the hub 17, leaving the completed bow, which is then free to be removed from the hub.

As above mentioned, either one or two figure 8-shaped base loops may be used, as desired. It is also possible to form a bow by the above procedure without using any base loops.

FIGURES 5 and 6 show another form of bow-making apparatus, designated generally at 11'. In this embodiment of the invention, the hub assembly comprises an annular rigid top member 30 threaded on the reduced shank portion 14, and a cooperating annular rigid bottom member 31 engaged on the shoulder 15. An annular intermediate body 32 of rubber or similar resilient deformable material is interposed between the members 30 and 31, being received in opposing concentric annular recesses 33 and 34 formed in said members 30 and 31. The body 32 is formed with a plurality of equally spaced radial bores 35 receiving the inner end portions of the rods 19. When the shank 12 is tightened relative to the upper hub member 30, compression is transmitted from shoulder 15 through bottom hub member 31 to the rubber-like body 32, causing said body to exert frictional clamping pressure on the rods 19, locking the rods to the hub assembly. The clamping pressure may be released by loosening shank 12 relative to the hub member 30. The procedure for forming a bow is the same as above described in connection with the embodiment of FIGURES 1 to 4.

While certain specific embodiments of an apparatus for forming multiple-loop ribbon bows have been disclosed in the foregoing description, it will be understood that

What is claimed is:

1. An apparatus for making ornamental bows from a web of ribbon-like material comprising a supporting shank provided at one end with an axially projecting web-impaling pin, hub means rotatably engageable on said one end, said hub means having a plurality of radially extending bores, web-supporting rod members receivable in said bores, and means clamping said rod members in said bores responsive to rotation of said shank relative to said hub means.

2. An apparatus for making ornamental bows from a web of ribbon-like material comprising a supporting shank provided at one end with an axially projecting web-impaling pin, a shoulder element on said shank adjacent said one end, hub means threadedly engageable on said one end and having an abutment portion engageable with said shoulder element, hub means rotatably engageable on said one end, said hub means having a plurality of radially extending bores, web-supporting rod members receivable in said bores, and means clamping said rod members in said bores responsive to tightening of said hub means against said shoulder element.

3. An apparatus for making ornamental bows from a web of ribbon-like material comprising a supporting shank provided at one end with an axially projecting web-impaling pin, a shoulder element on said shank adjacent said one end, hub means threadedly engageable on said one end and having an annular rigid abutment member engageable with said shoulder element, said hub means having a plurality of radially extending bores, web-supporting rod members receivable in said bores, and means clamping said rod members in said bores responsive to tightening of said rigid annular abutment member against said shoulder element.

4. An apparatus for making ornamental bows from a web of ribbon-like material comprising a supporting shank provided at one end with an axially projecting web-impaling pin, hub means rotatably engageable on said one end, said hub means having a plurality of radially extending bores, web-supporting rod members receivable in said bores, and means including a friction member of resilient deformable material surrounding said one end and clamping said rod members in said bores responsive to rotation of said shank relative to said hub means.

5. An apparatus for making ornamental bows from a web of ribbon-like material comprising a supporting shank having a reduced externally threaded end portion defining an annular abutment shoulder adjacent thereto, an axially projecting web-impaling pin on said end portion, hub means threadedly engageable on said end portion and having a plurality of radially extending bores, web-supporting rod members detachably received in said bores, said hub means including an annular member of resilient deformable material in frictional engagement with the inner ends of the rod members, and an annular rigid compression member surrounding said shank end portion and disposed between said abutment shoulder and said resilient deformable member, whereby to develop clamping force on the inner ends of the rod members responsive to tightening of the hub means on said shank end portion.

6. The apparatus of claim 5, and wherein said hub means has a bottom recess communicating with the bores, said resilient deformable member being in the form of an annular disc received in said recess, and said compression member being a rigid flat washer received in the recess beneath the disc.

7. The apparatus of claim 5, and wherein said hub means comprises a rigid top disc member in threaded engagement with said end portion and an annular body of resilient deformable material subjacent said top disc member and being formed with said radially extending bores, and said compression member comprises a bottom rigid disc member.

8. The apparatus of claim 7, and wherein said top and bottom rigid disc members are formed with opposing annular recesses receiving said annular body of resilient deformable material.

References Cited by the Examiner

UNITED STATES PATENTS 2,413,955   1/47   Cottrell _____ 223—46 X
2,860,399   11/58  Bates _____ 223—46 X JORDAN FRANKLIN, *Primary Examiner.*